(12) United States Patent
Wong

(10) Patent No.: US 6,195,490 B1
(45) Date of Patent: Feb. 27, 2001

(54) OPTICAL FIBER TUBE FOR A DECORATIVE LIGHT

(76) Inventor: Tsui-Tuan Wong, 15th Fl.-D, No. 81, Sec. 1, Hsintai 5th Rd., Hsitzu Chen, Taipei Hsien (TW)

( * ) Notice: Subject to any disclaimer, the term of this patent is extended or adjusted under 35 U.S.C. 154(b) by 0 days.

(21) Appl. No.: 09/307,527

(22) Filed: May 7, 1999

(51) Int. Cl.⁷ .................................................. G02B 6/44
(52) U.S. Cl. ......................... 385/104; 385/103; 385/111; 385/113
(58) Field of Search ..................................... 385/100, 104, 385/105, 106, 109, 113, 110, 111, 112, 103

(56) References Cited

U.S. PATENT DOCUMENTS

| 4,143,942 | * | 3/1979 | Anderson | 385/113 X |
| 4,153,332 | * | 5/1979 | Longoni | 385/113 X |
| 4,722,589 | * | 2/1988 | Priaroggia | 385/113 |
| 4,786,137 | * | 11/1988 | Cornelison et al. | 385/113 X |
| 4,966,434 | * | 10/1990 | Yonechi et al. | 385/104 |
| 5,082,348 | * | 1/1992 | Gartside, III et al. | 385/111 |
| 5,140,664 | * | 8/1992 | Bosisio et al. | 385/109 |
| 5,468,913 | * | 11/1995 | Seaman et al. | 385/104 X |
| 5,542,020 | * | 7/1996 | Horska | 385/112 |
| 5,751,880 | * | 5/1998 | Gaillard | 385/109 |
| 6,041,153 | * | 3/2000 | Yang | 385/109 |
| 6,066,397 | * | 5/2000 | Risch et al. | 385/113 X |

* cited by examiner

*Primary Examiner*—Brian Healy
(74) *Attorney, Agent, or Firm*—Thomas, Kayden, Horstemeyer & Risley LLP

(57) ABSTRACT

An optical fiber tube includes a core material having multiple nylon filaments twisted with each other in a helical manner, a plurality of single strand optical fibers mounted around the core material and twisted with the core material in a helical manner, a tubular protective film mounted around the plurality of single strand optical fibers, and a plastic sleeve mounted around the protective film.

6 Claims, 7 Drawing Sheets

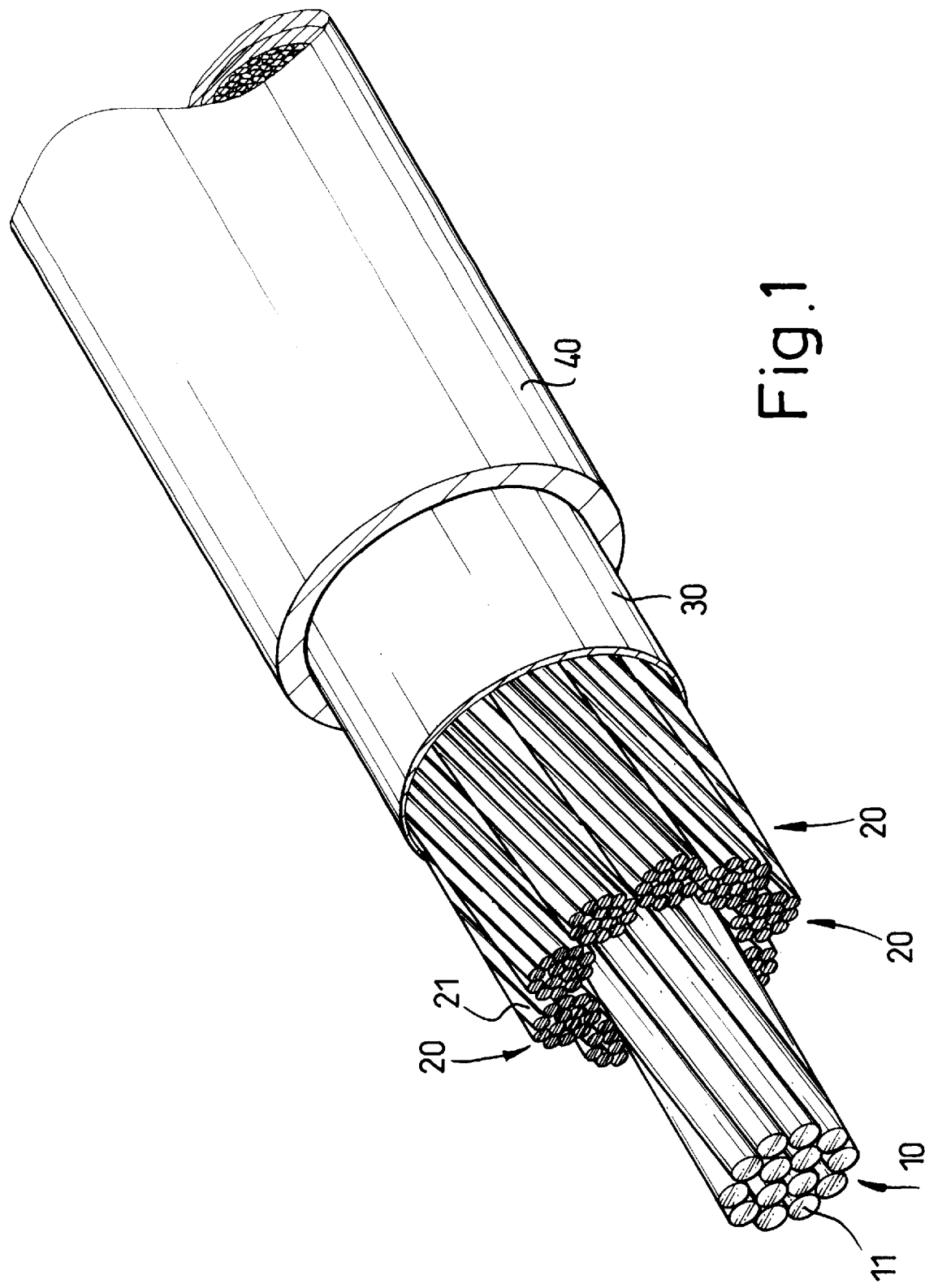

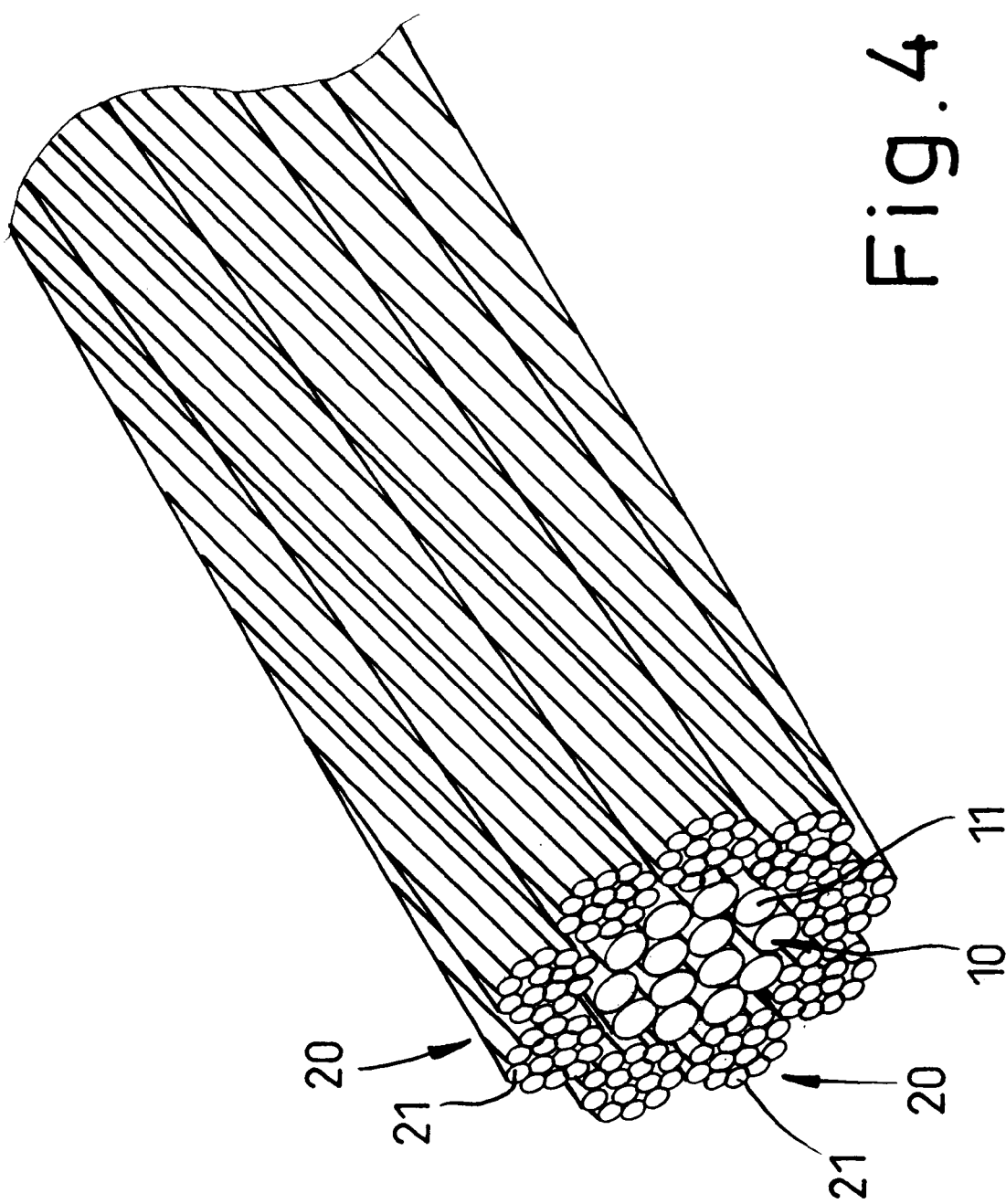

OPTICAL FIBER TUBE FOR A DECORATIVE LIGHT

CROSS-REFERENCES TO RELATED APPLICATIONS

Not Applicable.

BACKGROUND OF THE INVENTION

1. Field of the Invention

The present invention relates to an optical fiber tube, and more particularly to an optical fiber tube for a decorative light.

2. Description of the Related Art

A first conventional optical fiber tube for a decorative light in accordance with the prior art shown in FIG. 7 includes a core (81) and a cover (80) around the core (81). The core (81) and the cover (80) are both made of transparent materials with different refractive indexes. The refractive index of the core (81) is greater than that of the cover (80). When the incident angle of the light entering the core (81) is greater than a limiting angle, the light will be fully reflected and can then be propagated in the core (81).

A second conventional optical fiber tube for a decorative light in accordance with the prior art shown in FIGS. 8 and 9 includes a core material (90) made of polyvinyl chloride (P.V.C.), multiple single strand optical fibers (91) around the core material (90) and having multiple optical fibers (910) twisted with each other, a transparent tubular protective film (92) mounted around the single strand optical fibers (91), and a transparent plastic cover (93) mounted around the protective film (92). However, the optical fiber tube cannot be bent due to the rigidity of the core material (90), thereby decreasing the versatility of the optical fiber tube.

The present invention has arisen to mitigate and/or obviate the disadvantage of the conventional optical fiber tube.

BRIEF SUMMARY OF THE INVENTION

In accordance with one aspect of the present invention, an optical fiber tube comprises a core material including multiple nylon strands twisted with each other in a helical manner, a plurality of single strand optical fibers mounted around the core material and twisted with the core material in a helical manner, a tubular protective film mounted around the plurality of single strand optical fibers, and a plastic sleeve mounted around the protective film.

Each of the nylon strands of the core material has a diameter between 0.5 and 1.5 millimeters.

Each of the single strand optical fibers includes multiple optical fibers twisted with each other in a helical manner. Each of the optical fibers has a diameter between 0.5 and 1.5 millimeters.

The optical fiber tube includes one strand of core material, and six strands of single strand optical fibers twisted with the core material in a helical manner.

Alternatively, the optical fiber tube includes one strand of core material, and nine strands of single strand optical fibers twisted with the core material in a helical manner.

Further benefits and advantages of the present invention will become apparent after a careful reading of the detailed description with appropriated reference to the accompanying drawings.

BRIEF DESCRIPTION OF THE SEVERAL VIEWS OF THE DRAWINGS

FIG. 1 is perspective view of an optical fiber tube for a decorative light in accordance with the present invention;

FIG. 4 is a perspective view showing a plurality of single strand optical fibers as shown in FIG. 3 twisted with a core material of the optical fiber tube;

DETAILED DESCRIPTION OF THE INVENTION

Figure 9:
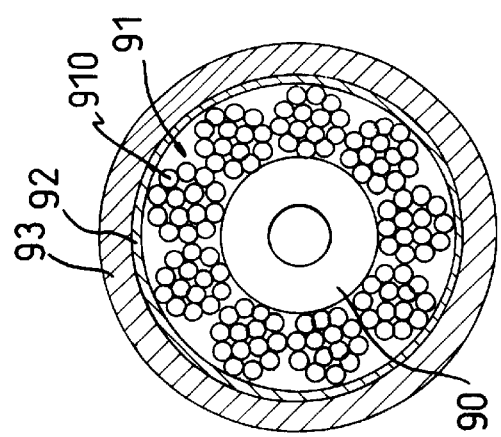
FIG. 9 is a cross-sectional view of the second conventional optical fiber tube as shown in FIG. 8.

The optical fibers described in the present invention are used to generate linear light in a special decorative light, and are not related to the optical fiber cables that are used to transmit signals.

Referring to the drawings and initially to FIGS. 1–4, an optical fiber tube in accordance with the present invention for a decorative light comprises a core material (10) including multiple nylon filaments (11) twisted with each other in a helical manner, a plurality of single strand optical fibers (20) mounted around the core material (10) and twisted with the core material (10) in a helical manner, a transparent and heatproof tubular protective film (30) mounted around the plurality of single strand optical fibers (20), and a heatproof plastic sleeve (40) mounted around the protective film (30).

The core material (10) is composed of fourteen nylon filaments (11) each having a diameter between 0.5 and 1.5 millimeters.

Figure 3:
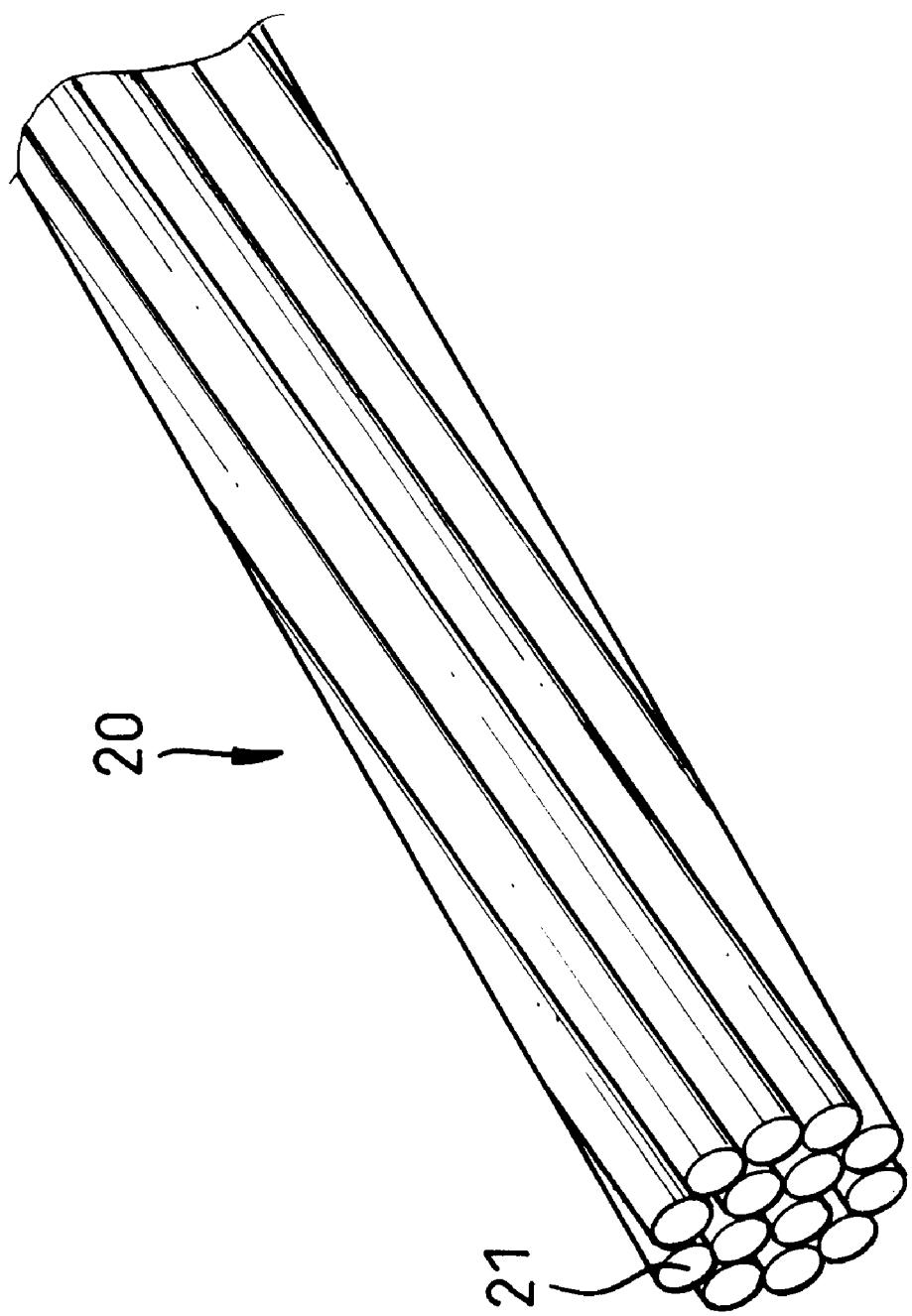
FIG. 3 is a perspective view of the single strand optical fiber of the optical fiber tube as shown in FIG. 1.

Each of the plurality of single strand optical fibers (20) includes multiple optical fibers (21) twisted with each other in a helical manner as shown in FIG. 3. Each of the optical fibers (21) has a diameter between 0.5 and 1.5 millimeters.

Figure 2:
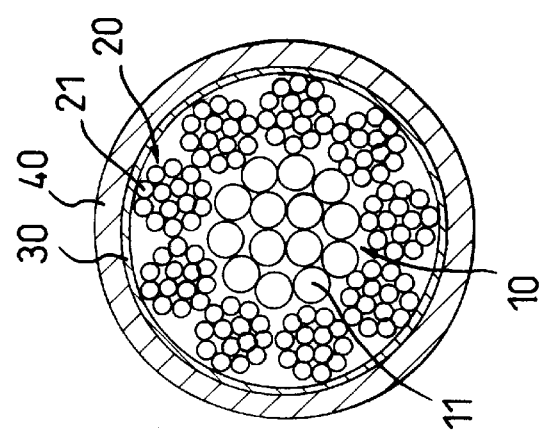
FIG. 2 is a cross-sectional view of the optical fiber tube as shown in FIG. 1.

Referring to FIG. 2, the optical fiber tube includes one strand of core material (10), and nine strands of single strand optical fibers (20) twisted with the core material (10) in a helical manner.

Figure 5:
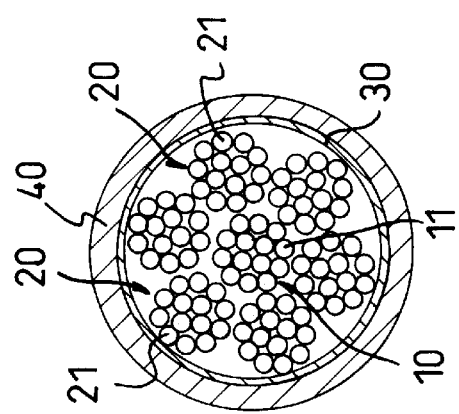
FIG. 5 is a cross-sectional view of the optical fiber tube as shown in FIG. 1, in accordance with another embodiment of the present invention.

Referring to FIG. 5, the optical fiber tube includes one strand of core material (10), and six strands of single strand optical fibers (20) twisted with the core material (10) in a helical manner.

In such a manner, the core material (10) is composed of multiple flexible nylon filaments (11) twisted in a helical manner such that the optical fiber tube is flexible so as to satisfy the requirement for greater flexibility, thereby increasing the versatility of the optical fiber tube.

In addition, the multiple optical fibers (21) are twisted with each other to form the single strand optical fiber (20), and the plurality of single strand optical fibers (20) are twisted with the core material (10), thereby greatly reducing the void between adjacent optical fibers (21) so as to increase the light emitting area of the optical fiber tube.

Figure 6:
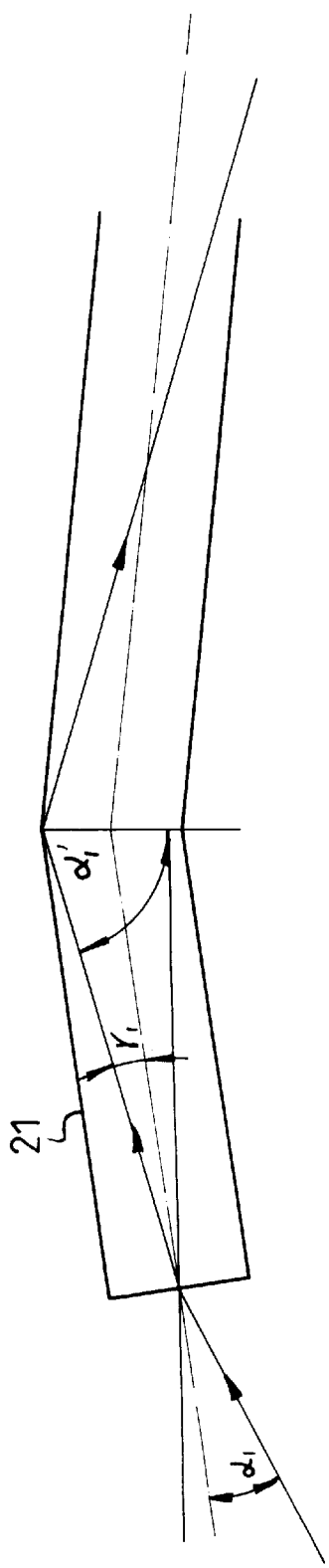
FIG. 6 is a schematic view showing the incident angle of light entering a twisted optical fiber.
Figure 10:
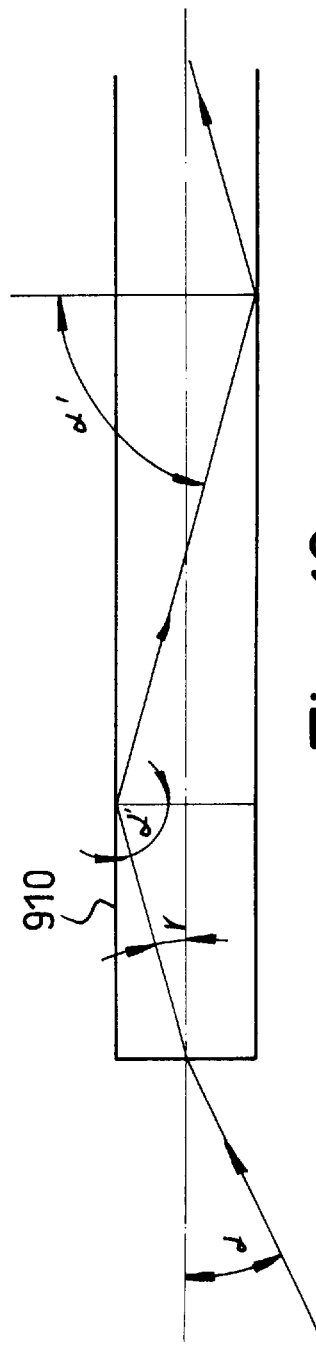
FIG. 10 is a schematic view showing the incident angle of light entering a conventional optical fiber that is not twisted.
Figure 7:
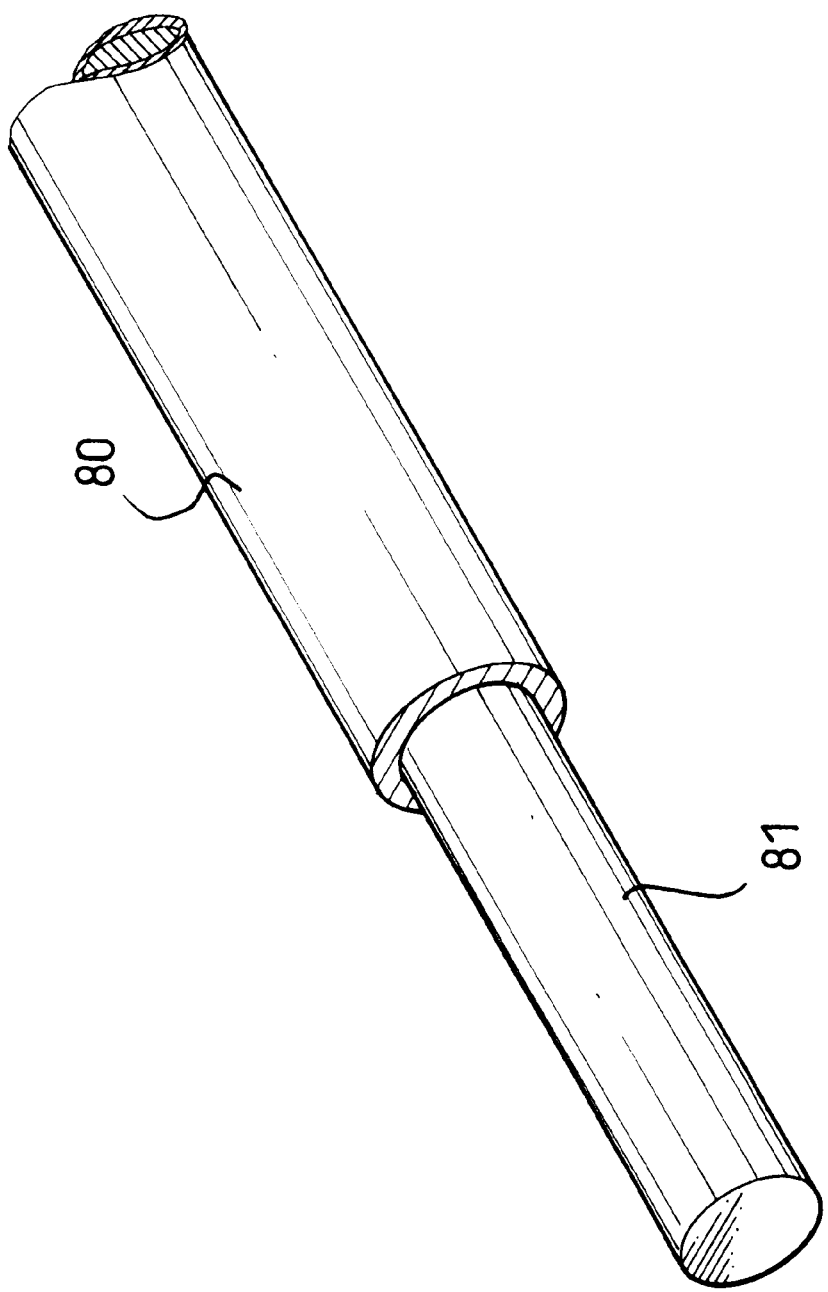
FIG. 7 is perspective view of a first conventional optical fiber tube for a decorative light in accordance with the prior art.
Figure 8:
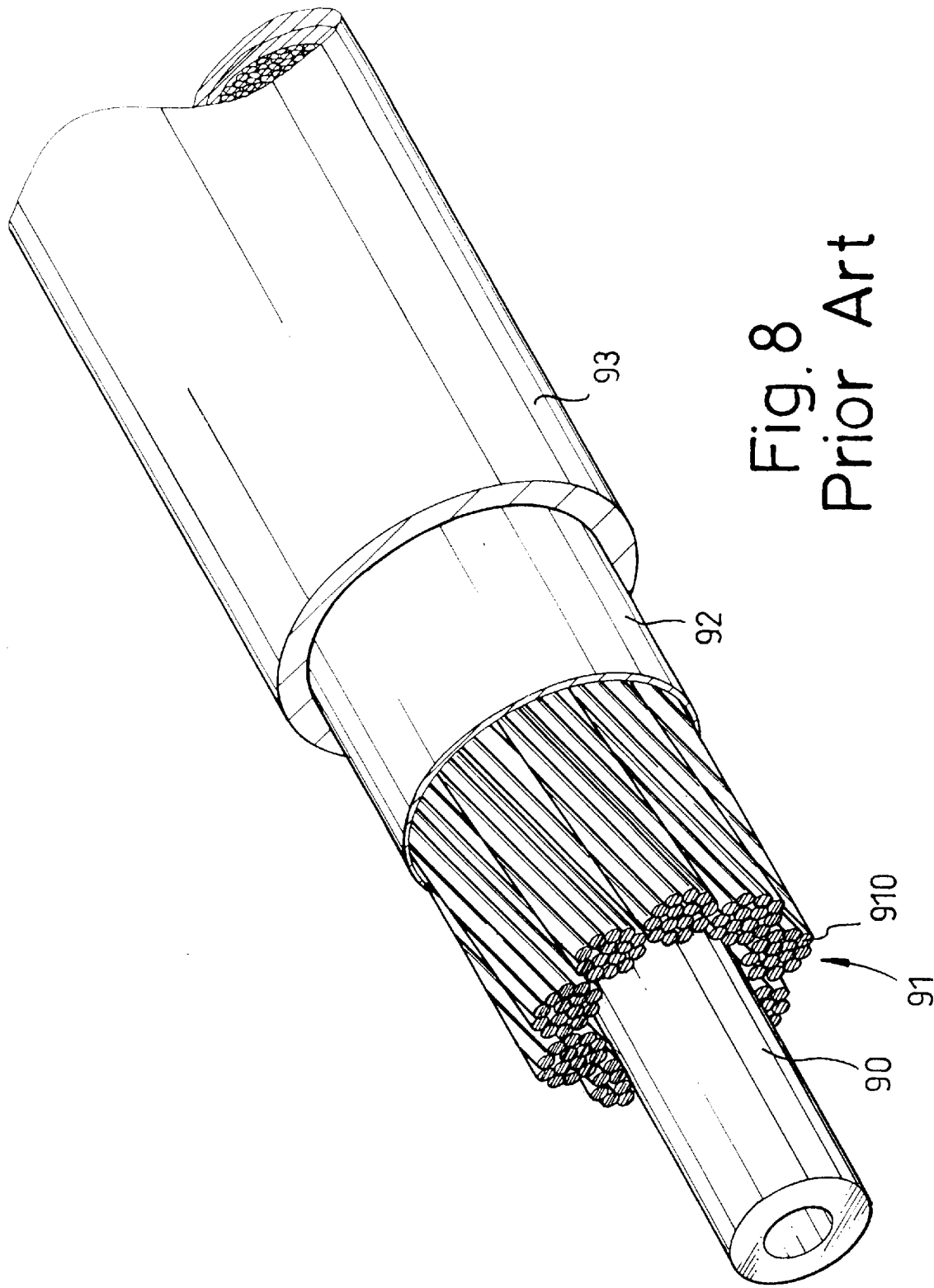
FIG. 8 is perspective view of a second conventional optical fiber tube for a decorative light in accordance with the prior art.

Further, with reference to FIGS. 6 and 10, the plurality of single strand optical fibers (20) are twisted with the core material (10), thereby varying the incident angle of light entering the single optical fiber (21). When the light enters the twisted single optical fiber (21), the incident angle $\alpha_1$ is smaller than the incident angle $\alpha$ of the light entering the conventional optical fiber (910) that is not twisted. That is $\alpha_1 < \alpha$. At the same time, the refractive angle $\gamma_1$ and the reflection angle $\alpha_1'$ of the optical fiber of the present invention is smaller than the refractive angle $\gamma$ and the reflection angle $\alpha'$ of the conventional optical fiber. That is, $\gamma_1 < \gamma$, and $\alpha_1 < \alpha'$.

In such a manner, in comparison with FIGS. 6 and 10, the light is evenly transmitted along the inner wall of the optical fiber (21) such that the light emitting from the optical fiber tube will present a tender and smooth appearance, thereby increasing the aesthetic quality of the decorative light by means of the optical fiber tube.

It should be clear to those skilled in the art that further embodiments may be made without departing from the scope and spirit of the present invention.

What is claimed is:

1. An optical fiber tube comprising:
   a core material (10) including multiple nylon filaments (11) twisted with each other in a helical manner;
   a plurality of single strand optical fibers (20) mounted around said core material (10) and twisted with said core material (10) in a helical manner;
   a tubular protective film (30) mounted around said plurality of single strand optical fibers (20); and
   a plastic sleeve (40) mounted around said protective film (30).

2. The optical fiber tube in accordance with claim 1, wherein each of said nylon filaments (11) of said core material (10) has a diameter between 0.5 and 1.5 millimeters.

3. The optical fiber tube in accordance with claim 1, wherein each of said plurality of single strand optical fibers (20) includes multiple optical fibers (21) twisted with each other in a helical manner.

4. The optical fiber tube in accordance with claim 3, wherein each of said optical fibers (21) has a diameter between 0.5 and 1.5 millimeters.

5. The optical fiber tube in accordance with claim 1, wherein said optical fiber tube includes one strand of core material (10), and six strands of single strand optical fibers (20) twisted with said core material (10) in a helical manner.

6. The optical fiber tube in accordance with claim 1, wherein said optical fiber tube includes one strand of core material (10), and nine strands of single strand optical fibers (20) twisted with said core material (10) in a helical manner.

* * * * *